(12) United States Patent
Li et al.

(10) Patent No.: US 9,978,384 B2
(45) Date of Patent: May 22, 2018

(54) AUDIO DECODING USING MODULATOR-DEMODULATOR

(71) Applicant: VIA TECHNOLOGIES, INC., New Taipei (TW)

(72) Inventors: Yong Li, Beijing (CN); Zongpu Qi, Beijing (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 61 days.

(21) Appl. No.: 14/332,670

(22) Filed: Jul. 16, 2014

(65) Prior Publication Data

US 2015/0356979 A1 Dec. 10, 2015

(30) Foreign Application Priority Data

Jun. 9, 2014 (CN) .......................... 2014 1 0251059

(51) Int. Cl.

| | |
|---|---|
| *G10L 19/04* | (2013.01) |
| *G06F 3/16* | (2006.01) |
| *G10L 19/16* | (2013.01) |
| *H04M 1/725* | (2006.01) |

(52) U.S. Cl.
CPC .............. *G10L 19/04* (2013.01); *G06F 3/162* (2013.01); *G10L 19/167* (2013.01); *H04M 1/72558* (2013.01)

(58) Field of Classification Search
CPC ......... G11B 2020/00057; G06F 1/3203; G10L 19/167; H04M 1/72558
USPC .......................... 704/500; 381/94.1; 713/320
See application file for complete search history.

(56) References Cited

U.S. PATENT DOCUMENTS

| 7,272,730 B1 * | 9/2007 | Acquaviva ............ G06F 1/3203 713/300 |
| 2002/0072817 A1 * | 6/2002 | Champion ............. H04H 20/82 700/94 |
| 2004/0198468 A1 * | 10/2004 | Patel ...................... H02J 7/0013 455/574 |
| 2005/0171763 A1 * | 8/2005 | Zhou ................. G11B 20/10527 704/201 |

(Continued)

FOREIGN PATENT DOCUMENTS

| CN | 102483647 | 5/2012 |
| CN | 103219009 | 7/2013 |

OTHER PUBLICATIONS

Chinese language office action dated Sep. 6, 2016, issued in application No. CN 201410251059.8.

*Primary Examiner* — Douglas Godbold
*Assistant Examiner* — Mark Villena
(74) *Attorney, Agent, or Firm* — McClure, Qualey & Rodack, LLP

(57) ABSTRACT

An electronic device is provided. The electronic device includes: a first processing unit; a storage unit, configured to store at least one audio file; a first memory unit; and a modulator-demodulator (modem), configured to perform audio processing of the electronic device during a phone call, wherein when the electronic device is used to play the audio file, the first processing unit reads the audio file from the storage unit, retrieves header information of the audio file, and writes the audio file into the first memory unit, wherein the modem accesses the audio file stored in the first memory unit based on the header information, and performs audio decoding on the audio file.

18 Claims, 3 Drawing Sheets

(56) References Cited

U.S. PATENT DOCUMENTS

| | | | |
|---|---|---|---|
| 2006/0130638 A1* | 6/2006 | Okada | G10H 7/006 84/609 |
| 2006/0239500 A1* | 10/2006 | Meyer | G06T 1/0028 382/100 |
| 2007/0002846 A1* | 1/2007 | Rada | H01Q 3/30 370/358 |
| 2007/0229122 A1* | 10/2007 | Kiyozaki | G06F 1/3203 327/108 |
| 2007/0230361 A1* | 10/2007 | Choudhury | H04L 12/2602 370/250 |
| 2008/0039017 A1* | 2/2008 | Kim | H04M 1/6066 455/41.2 |
| 2008/0215343 A1* | 9/2008 | Goto | G10L 19/167 704/500 |
| 2008/0307240 A1* | 12/2008 | Dahan | G06F 1/06 713/320 |
| 2009/0171674 A1* | 7/2009 | Mitsumori | G11B 20/00007 704/500 |
| 2010/0095089 A1* | 4/2010 | Kwon | G06F 15/167 712/30 |
| 2010/0246849 A1* | 9/2010 | Sudo | H03G 3/32 381/94.1 |
| 2010/0305731 A1* | 12/2010 | Masuda | G10L 19/02 700/94 |
| 2011/0055434 A1 | 3/2011 | Pyers et al. | |
| 2011/0087487 A1* | 4/2011 | Neuman | G11B 20/00007 704/201 |
| 2011/0151885 A1* | 6/2011 | Buyukkoc | H04W 72/1247 455/452.1 |
| 2011/0158438 A1* | 6/2011 | Choi | H04R 5/04 381/122 |
| 2011/0246206 A1* | 10/2011 | Kim | G10L 19/167 704/500 |
| 2011/0262104 A1* | 10/2011 | Kiyosawa | G11B 27/005 386/241 |
| 2012/0158409 A1* | 6/2012 | Nagel | G10L 19/0208 704/500 |
| 2013/0297833 A1* | 11/2013 | Vadivelu | G06F 13/126 710/5 |
| 2014/0095747 A1* | 4/2014 | Sherman | G06F 9/5038 710/74 |
| 2014/0233616 A1* | 8/2014 | Belghoul | H04M 11/06 375/222 |
| 2015/0146885 A1* | 5/2015 | Fitzgerald | H04R 3/005 381/98 |
| 2015/0208193 A1* | 7/2015 | Tu | H04W 4/008 455/41.3 |
| 2016/0226945 A1* | 8/2016 | Granqvist | G06F 19/3418 |

* cited by examiner

AUDIO DECODING USING MODULATOR-DEMODULATOR

CROSS REFERENCE TO RELATED APPLICATIONS

This application claims priority of China Patent Application No. 201410251059.8, filed on Jun. 9, 2014, the entirety of which is incorporated by reference herein.

BACKGROUND OF THE INVENTION

Field of the Invention

The present invention relates to audio processing, and, in particular, to an electronic device and audio playing method capable of perform audio decoding and playback by using a modulator-demodulator (modem).

Description of the Related Art

With advances in technology, mobile devices such as smartphones and tablet PCs have become widely used. Due to limited resources, the decoding of audio files in conventional mobile devices is usually performed by a central processing unit (CPU) or a digital signal processor (DSP). However, the components such as the CPU or DSP may have huge power consumption while performing audio decoding. When a user uses a conventional mobile device only to play audio files, the battery of the conventional mobile device may exhaust rapidly if the CPU or DSP is kept working. Accordingly, an electronic device is needed to effectively lower the power consumption needed to play the audio files. In addition, in the technology of using a DSP to perform audio decoding, the power consumption of the CPU can be reduced to a certain level. However, since the CPU is still required to control the playing of the audio files, the CPU still has a certain level of power consumption. Moreover, the hardware cost may be increased due to an extra DSP.

BRIEF SUMMARY OF THE INVENTION

A detailed description is given in the following embodiments with reference to the accompanying drawings.

In an exemplary embodiment, an electronic device is provided. The electronic device includes: a first processing unit; a storage unit, configured to store at least one audio file; a first memory unit; and a modulator-demodulator (modem), configured to perform audio processing of the electronic device during a phone call, wherein when the electronic device is used to play the audio file, the first processing unit reads the audio file from the storage unit, retrieves header information of the audio file, and writes the audio file into the first memory unit, wherein the modem accesses the audio file stored in the first memory unit based on the header information, and performs audio decoding on the audio file.

In another exemplary embodiment, an audio playing method for use in an electronic device is provided. The electronic device comprises a first processing unit, a storage unit, a first memory unit, and a modulator-demodulator (modem), wherein the storage unit stores at least one audio file. The method has the steps of: utilizing the first processing unit to read the audio file from the storage unit, retrieve header information of the audio file, and write the audio file into the first memory unit when the electronic device is used to play the audio file; and utilizing the modem to access the audio file stored in the first memory unit based on the header information, and performing audio decoding on the audio file.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
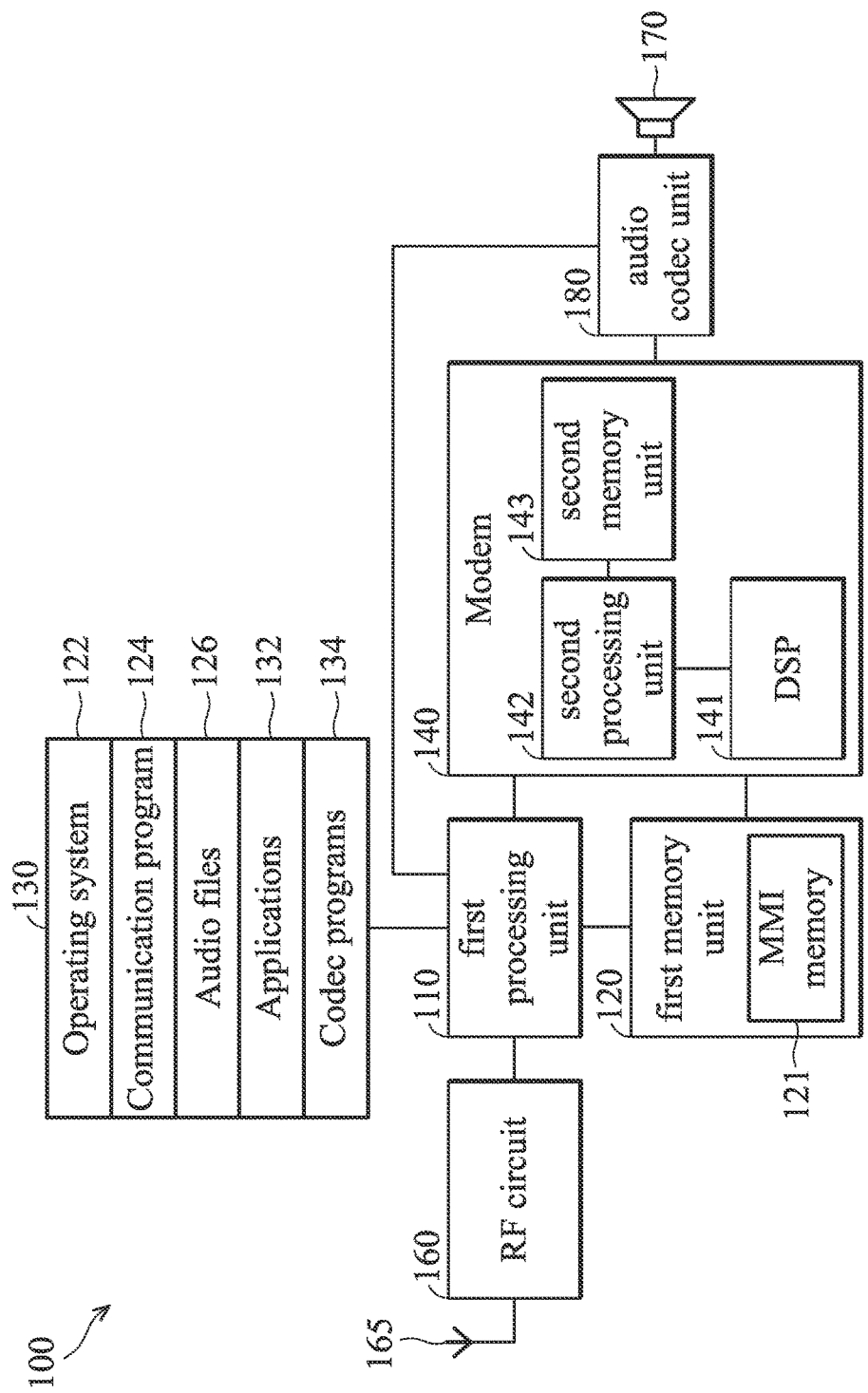
FIG. 1 is a schematic block diagram of an electronic device 100 in accordance with an embodiment of the invention.

FIG. 1 is a schematic block diagram of an electronic device 100 in accordance with an embodiment of the invention. As shown in FIG. 1, the electronic device 100 may comprise a first processing unit 110, a first memory unit 120, a storage unit 130, a modulator-demodulator (modem) 140, and a display unit 150. In an embodiment, the electronic device 100 may be a device having a modem such as a cellular phone, a smartphone, a feature phone, or a tablet PC, wherein the electronic device 100 is connected to a communication network or other electronic device via the modem. Additionally, the modem may support multiple communication protocols such as CDMA, GSM, EDGE, HSDPA, Wifi (e.g. IEEE 802.11a/b/g/n), Bluetooth, or WiMAX.

In an embodiment, the first processing unit 110 may be one or more CPU, general-purpose processor, DSP, and application processor, which is configured to perform instructions stored in one or more types of computer-readable mediums of the first memory unit 120. The first memory unit 120 and the storage unit 130 may comprise one or more types of computer-readable mediums. For example, the first memory unit 120 may be a high-speed random access memory (e.g. SRAM or DRAM), and the storage unit 130 may be a non-volatile memory such as a flash memory (e.g. embedded multimedia card, EMMC). The storage unit 130 may store program codes of an operating system 122 such as LINUX, UNIX, OS X, Android, iOS, Windows, or an embedded operating system. The operating system 122 is configured to process basic system services and to perform multiple programs of hardware dependent tasks. The storage unit 130 may store a communication program 124 that can execute a communication procedure, which is configured to communicate with one or more extra devices, one or more computers, and/or one or more servers.

In an embodiment, the storage unit 130 may further comprise one or more applications 132. For example, the applications 132 stored in the storage unit 130 may comprise a telephone application, an email application, text message or instant message applications, note applications, an address book or a contact list, a calendar application, a media player program, and a music management application. In addition, the storage unit 130 may further store one or more audio files 126, which are played by the applications 132.

The storage unit 130 further comprises a codec program 134, configured to process the audio file 126 to be played by the application 132. For example, the first processing unit 110 may execute the codec program 134 to perform encoding and decoding of the audio file 126. In one embodiment of the invention, the encoding and decoding of the audio files can be implemented by using hardware (e.g. modem 140) instead of by application (e.g. the codec program 134) executed by the first processing unit 110, and the details will be described later. In another embodiment, the encoding and decoding of the audio file 126 can be performed by hardware (e.g. modem 140) and/or software (e.g. codec program 134 executed by a CPU or DSP).

In an embodiment, the electronic device 100 further comprises a radio frequency (RF) circuit 160 coupled to one or more antenna 165, which may allow the electronic device 100 to communicate with one or more additional devices, computers, and/or servers via a wireless network. The electronic device 100 may support multiple communication protocols such as CDMA, GSM, EDGE, HSDPA, Wifi (e.g. IEEE 802.11a/b/g/n), Bluetooth, Wi-MAX, E-mail, instant messaging, and/or SMS, but the invention is not limited thereto.

The details of encoding and decoding of the audio files 126 by using the hardware modem 140 are described as following. When the audio file 126 is to be played by the electronic device 100 (e.g. the user of the electronic device 100 selects the audio file 126 via one of the applications 132), the first processing unit 110 may read the audio file 126 from the storage unit 130, retrieve header information of the audio file 126, and write the audio file 126 to the first memory unit 120. Different with the prior art, in the invention, the access of the audio file 126 from the first memory unit 120 and the encoding and decoding of the audio file 126 can be performed by the modem 140 based on the header information of the audio file 126 retrieved from the first memory unit 120 instead of utilizing the first processing unit 110 to execute the codec program 134 to perform encoding and decoding of the audio file 126. In an embodiment, the first processing unit 110 and the modem 140 share a portion of the memory space of the first memory unit 120, such as the multimedia interface memory (MMI memory) 121. That is, the MMI memory 121 can be directly accessed by both the first processing unit 110 and the modem 140. The first processing unit 110 may write the audio file 126 to the MMI memory 121 of the first memory unit 120, and the modem 140 may retrieve the audio file 126 from the MMI memory 121 of the first memory unit 120 and perform audio decoding on the retrieved audio file 126.

In another embodiment, the first processing unit 110 does not share the first memory unit 120 with the modem 140. That is, the modem 140 cannot access the first memory unit 120 directly, and the associated data like the audio files are transmitted through the serial link (e.g. USB bus) coupled between the first processing unit 110 and the modem 140 and temporarily stored in the second memory unit 143 internal to the modem 140. Since the memory space of the second memory unit 143 of the modem 140 is very limited (e.g. 1 M bytes) and usually smaller than the size of the audio file 126. When there is more than one audio file to be played, the temporary memory space of the second memory unit 143 is not sufficient to store associated data like the audio files. In the implementation, a synchronizing manner is used when decoding and storing the associated data like the audio files by the first processing unit 110 and the modem 140. That is, the first processing unit 110 retrieves a portion of the audio file data (e.g. data of a frame) from the first memory unit 120, and temporarily stores the retrieved audio file data to the second memory unit 143 of the modem 140 via said serial link. Afterwards, the modem 140 retrieves the audio file data from the second memory unit 143, performs audio decoding on the retrieved audio file data, and informs the first processing unit 110 that the first processing unit 110 should retrieve the audio file data of the next frame and transmitting the audio file data of the next frame to the modem 140. In an embodiment, the modem 140 may comprise a second processing unit 142. Generally, the second processing unit 142 is configured to perform encoding and decoding of the acoustic signals, which are produced during the user uses the electronic device 100 to make a phone call. In an embodiment, the second processing unit 142 may decode the audio file data temporarily stored in the first memory unit 120 based on the header information retrieved by the first processing unit 110, wherein the audio file data may be a MP3 file or a LPCM file, but the invention is not limited thereto.

In an embodiment, the step of "decoding" indicates converting the audio file data to audio data in a pulse code modulation (PCM) format by the second processing unit 142 based on the parameters of the audio file 126 contained in the header information, such as the version, frame rate, etc. For example, if the second processing unit 142 knows that the frame rate of the audio file 126 is 44.1K/sec based on the header information, the second processing unit 142 may convert the audio file 126 to an audio file in the PCM format based on the corresponding frame rate. The second processing unit 142 may further control access to various data and other computation functions of the modem 140, wherein the second processing unit 142 may be a CPU, a general-purpose processor, an Advanced RISC Machines (ARM) processor, etc. In the invention, the encoding and decoding of the audio file 126 can be implemented by the hardware modem 140 rather than implemented by using the codec program 134 executed by the first processing unit 110. Accordingly, when the modem 140 performs audio decoding, the first processing unit 110 may enter a sleep state if the first processing unit 110 does not perform any other task except playing the audio file 126, thereby reducing power consumption. In the cases which only need playing audio files, the power consumption of the electronic device 100 can be significantly reduced in the invention.

In an embodiment, the modem 140 further comprises a DSP 141, which is configured to perform digital signal processing on the audio data in the PCM format, wherein the digital signal processing comprises, but not limited to, equalization, level control and etc.

In another embodiment, the electronic device 100 further comprises an audio codec unit 180, which is configured to perform digital-to-analog (D/A) conversion to the audio file data decoded by the modem 140, and to perform other signal processing (e.g. amplifying) on the audio file data to output to an external device (e.g. speaker 170, or a Bluetooth headset). In addition, the audio codec unit 180 is further configured to output the acoustic signals from the second processing unit 142 or acoustic signals from the first processing unit 110 through the framework layer, to an external device.

Figure 2:
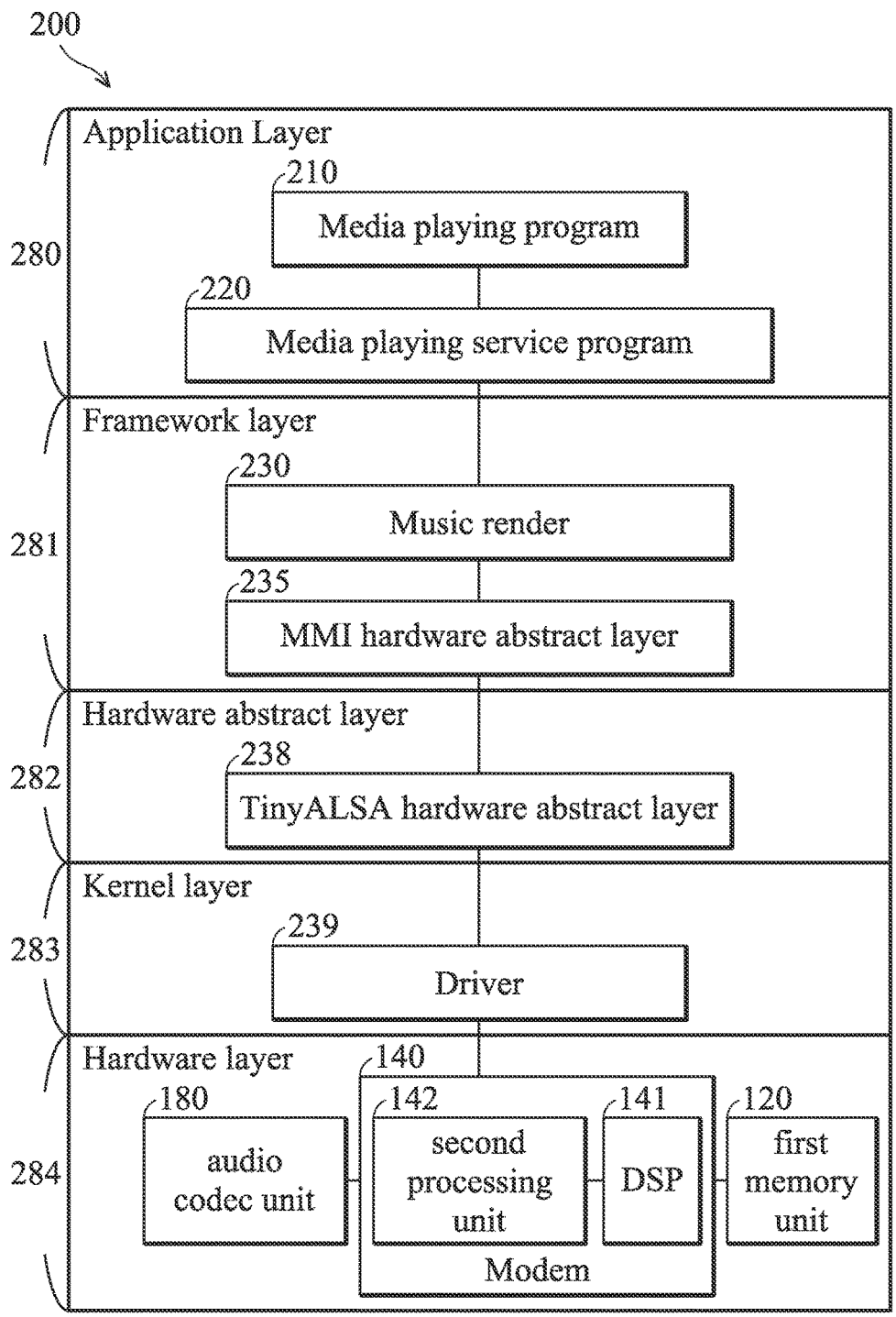
FIG. 2 is a diagram of the hardware and software architecture of the electronic device 100 in accordance with an embodiment of the invention.

FIG. 2 is a diagram of the hardware and software architecture of the electronic device 100 in accordance with an embodiment of the invention. Taking the Android operating system as an example, the architecture 200 can be illustrated by FIG. 2. In an embodiment, the user may select the audio files (e.g. MP3 or WAV files) to be played through the user interface or the software/hardware button of the electronic device 100. In an embodiment, the first processing unit 110 may execute a media playing program 210 and activate a media playing service program 220, wherein the media playing service program 220 may write the audio files to be played to the first memory unit 120 via a framework layer 281. For example, the framework layer 281 comprises a music render 230 (e.g. a MP3 render), and a multimedia interface hardware abstraction layer (MMI-HAL) 235. The music render 230 may process the audio file data and retrieve the header information, and write the processed audio file data to the first memory unit 120 (e.g. DRAM) through the MMI-HAL 235. In an embodiment, the architecture 200 further comprises a kernel layer 283. The audio file data passing through the framework layer 281 are further written into the first memory unit 120 through the kernel layer 283. The kernel layer 283 comprises various drivers such as a hardware driver for the modem 140, a hardware driver for the audio codec unit 180, libraries, and/or playlists. Through the framework layer 281, the second processing unit 142 of the invention could directly access the MMI memory 121 of the first memory unit 120 to read the required data during the audio decoding process, and then perform audio decoding on the audio file. Afterwards, the second processing unit 142 may perform digital signal processing on the decoded audio file data by the DSP 141. At last, the second processing unit 142 may transmit the decoded audio file data to the audio codec unit 180 via an audio interface (not shown), and the audio codec unit 180 may perform digital-to-analog conversion to the decoded audio file data and then output the analog signals to play.

In the aforementioned embodiment, the user may also control the media playing program 210 by using the user interface or the software/hardware buttons of the electronic device 100, and the control commands may be "Previous", "Next", "Pause", "Stop", "Fast-Forward", or "Rewind", etc. Additionally, when the electronic device 100 receives a call, the first processing unit 110 may also sends a stop command. Meanwhile, the media playing service program 220 may transmit the control commands issued by the user to the modem 140 via the framework layer 281 (e.g. via the MMI-HAL 235 of the framework layer 281), thereby controlling the modem 140 to perform audio decoding on the audio file 126. In another embodiment, if the control command (e.g. volume up/down) is a command which needs to be sent to the audio codec unit 180, the control commands are transmitted to the audio codec unit 180 via the framework layer 281 and the hardware abstraction layer 282 (e.g. the TinyALSA HAL 238 in the Android operating system). In an embodiment, all the control commands being sent to hardware components of the electronic device 100 should pass through the kernel layer 283 of the operating system. Specifically, the first processing unit 110 may retrieve the header information (e.g. the version, tag, error check codes, number of audio channels, format, frame rate, etc., but not limited) of a single audio file or multiple audio files in a playlist, and set up the second processing unit 142 based on the header information. The second processing unit 142 may perform decoding on the audio file based on the header information, and transmit the decoded audio file to the DSP 141 for subsequent digital signal processing. The audio codec unit 180 further performs digital-to-analog conversion to the audio signal obtained after the decoding process and digital signal processing, and output the converted audio signal to the speaker 170 or a Bluetooth headset.

In another embodiment, the modem 140 further comprises a second memory unit 143, which is configured to store the data required in the audio encoding and decoding processes or modulation and demodulation processes. Briefly, in the aforementioned embodiment, the first processing unit 110 and the modem 140 share a portion of the first memory unit 120. In addition, in the alternative embodiment as described above, the first processing unit 110 and the modem 140 may use different memory units.

Figure 3:
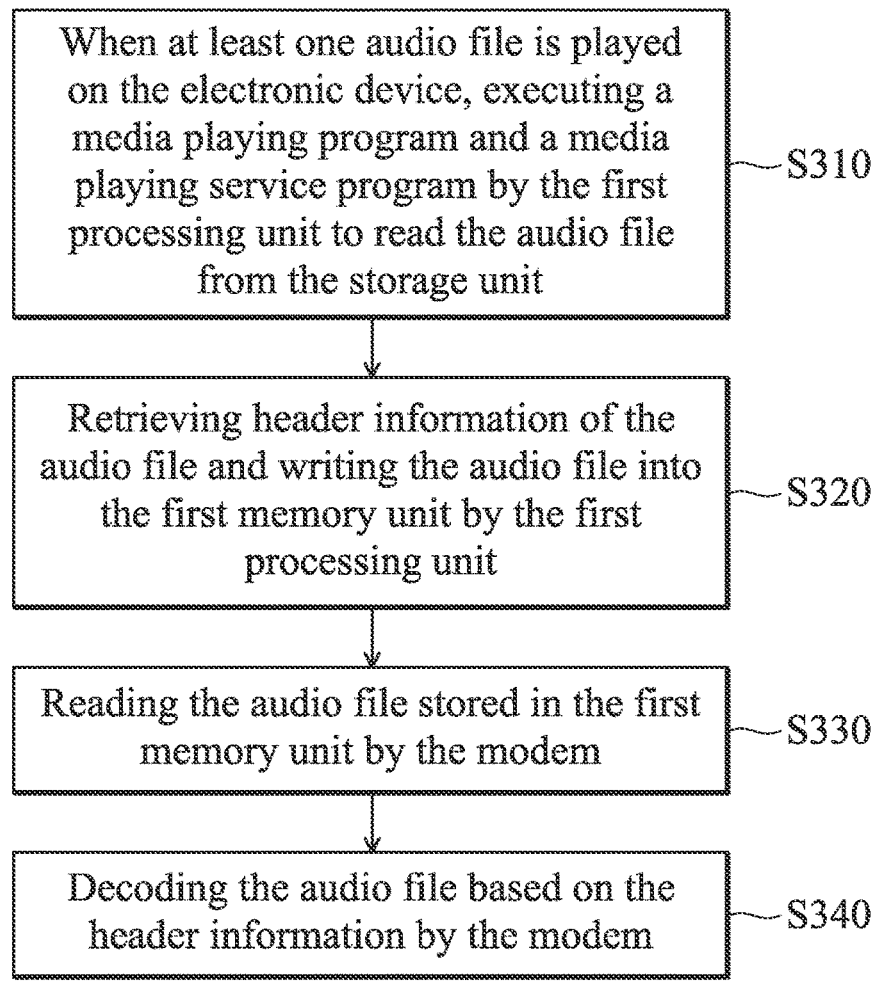
FIG. 3 is a flow chart of an audio playing method in accordance with an embodiment of the invention.

FIG. 3 is a flow chart of an audio playing method in accordance with an embodiment of the invention. In step S310, when at least one audio file is to be played on the electronic device 100, a media playing program and a media playing service program are executed by the first processing unit 110, thereby reading the audio file 126 from the storage unit 130. In step S320, the first processing unit 110 retrieves header information of the audio file 126, and writes the audio file 126 into the first memory unit 120. In step S330, the modem 140 (e.g. the second processing unit 142) reads the audio file stored in the first memory unit 120. In step S340, the modem 140 (e.g. the second processing unit 142) decodes the audio file based on the header information.

It should be noted that the first processing unit 110 could enter a sleep state to save power when the electronic device 100 is only used to play audio files in the aforementioned embodiment. Specifically, conventional smartphones use the CPU or DSP to perform audio decoding. However, greater power consumption may be induced by the CPU or DSP while performing audio decoding. However, a modem is usually equipped in a smartphone for making phone calls, and in the invention, the processing unit having lower power consumption in the modem is utilized to perform audio decoding on the audio files instead of using the CPU or DSP of the smartphone. Furthermore, the CPU and DSP of the smartphone may enter a sleep state while performing audio processing, thereby significantly reducing power consumption.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a first processing unit;
   a storage unit, configured to store at least one audio file, wherein the audio file comprises music data;
   a first memory unit; and
   a modulator-demodulator (modem), configured to perform audio processing for the electronic device during a phone call,
   wherein when the electronic device is used to play the audio file, the first processing unit reads the audio file from the storage unit, retrieves header information of the music data of the audio file, and writes the music data of the audio file into the first memory unit,
   wherein the modem accesses the music data of the audio file written by the first processing unit in the first memory unit, and performs audio decoding of the music data of the audio file based on the header information retrieved by the first processing unit,
   wherein the first processing unit enters a sleep state when the modem performs audio decoding.

2. The electronic device as claimed in claim 1, wherein the modem directly accesses the audio file stored in the first memory unit.

3. The electronic device as claimed in claim 1, wherein the modem further comprises a second processing unit, and performing audio decoding on the audio file indicates that the second processing unit converts the audio file to audio data in a pulse code modulation (PCM) format based on the header information.

4. The electronic device as claimed in claim 3, wherein the modem further comprises a digital signal processor (DSP), and the DSP performs digital signal processing on the audio data in the PCM format.

5. The electronic device as claimed in claim 1, further comprising:
  an audio codec unit, configured to perform digital-to-analog conversion to the audio file decoded by the modem, and output the converted audio file to play.

6. The electronic device as claimed in claim 1, wherein when the first processing unit receives a control command to control playing of the audio file, the first processing unit transmits the control command to the modem via a framework layer, thereby controlling the modem to perform audio decoding on the audio file.

7. The electronic device as claimed in claim 6, wherein the framework layer further comprises a multimedia interface hardware abstraction layer, and the first processing unit transmits the control command to the modem via the multimedia interface hardware abstraction layer and a kernel layer.

8. The electronic device as claimed in claim 1, wherein the first processing unit writes the audio file into the first memory unit via a framework layer.

9. The electronic device as claimed in claim 8, wherein the framework layer further comprises a music render, and the first processing unit retrieves the header information through the music render.

10. An audio playing method for use in an electronic device, wherein the electronic device comprises a first processing unit, a storage unit, a first memory unit, and a modulator-demodulator (modem), and the storage unit stores at least one audio file, wherein the audio file comprises music data, the method comprising:
  utilizing the first processing unit to read the music data of the audio file from the storage unit, retrieve header information of the music data of the audio file, and write the music data of the audio file into the first memory unit when the electronic device is used to play the audio file; and
  utilizing the modem to access the music data of the audio file written by the first processing unit in the first memory unit, and performing audio decoding of the music data of the audio file based on the header information retrieved by the first processing unit,
  wherein the first processing unit enters a sleep state when the modem performs audio decoding.

11. The method as claimed in claim 10, wherein the modem directly accesses the audio file stored in the first memory unit.

12. The method as claimed in claim 10, wherein the step of performing audio decoding on the audio file indicates that the second processing unit converts the audio file to audio data in a pulse code modulation (PCM) format based on the header information, wherein the header information comprises a version and frame rate of the audio file.

13. The method as claimed in claim 12, further comprising:
  performing digital signal processing on the audio data in the PCM format.

14. The method as claimed in claim 10, further comprising:
  utilizing an audio codec unit to perform digital-to-analog conversion to the audio file decoded by the modem and output the converted audio file to play.

15. The method as claimed in claim 10, wherein when the first processing unit receives a control command to control playing of the audio file, the first processing unit transmits the control command to the modem via a framework layer, thereby controlling the modem to perform audio decoding on the audio file.

16. The method as claimed in claim 15, wherein the framework layer further comprises a multimedia interface hardware abstraction layer, and the first processing unit transmits the control command to the modem via the multimedia interface hardware abstraction layer and a kernel layer.

17. The method as claimed in claim 10, wherein the first processing unit writes the audio file into the first memory unit via a framework layer.

18. The method as claimed in claim 17, wherein the framework layer further comprises a music render, and the first processing unit retrieves the header information through the music render.

* * * * *